T. O'LEARY.
TRUCK FOR MOVING TREES, &c.
APPLICATION FILED DEC. 21, 1914.
1,161,878.
Patented Nov. 30, 1915.
2 SHEETS—SHEET 1.
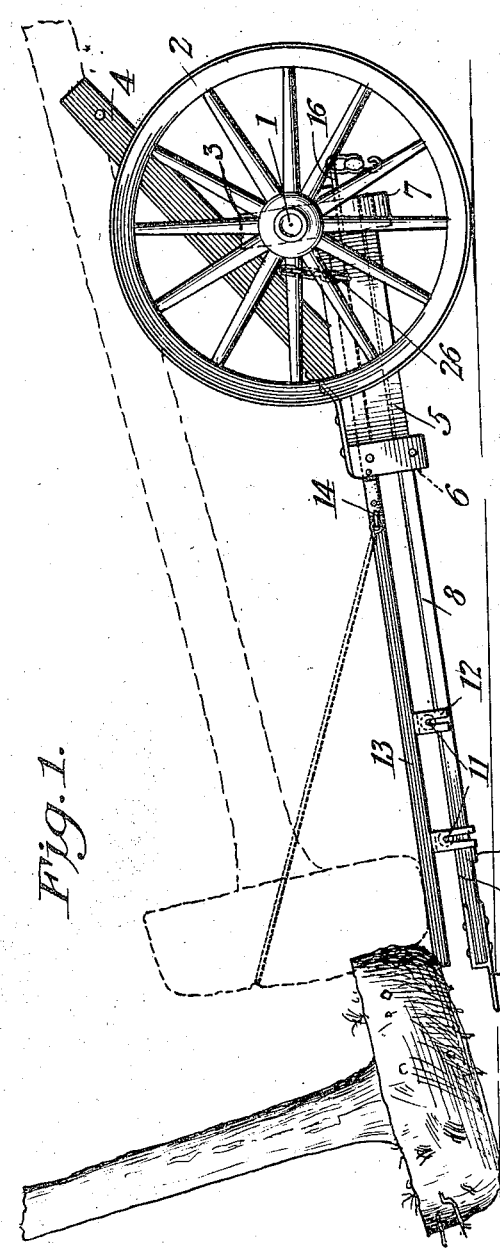
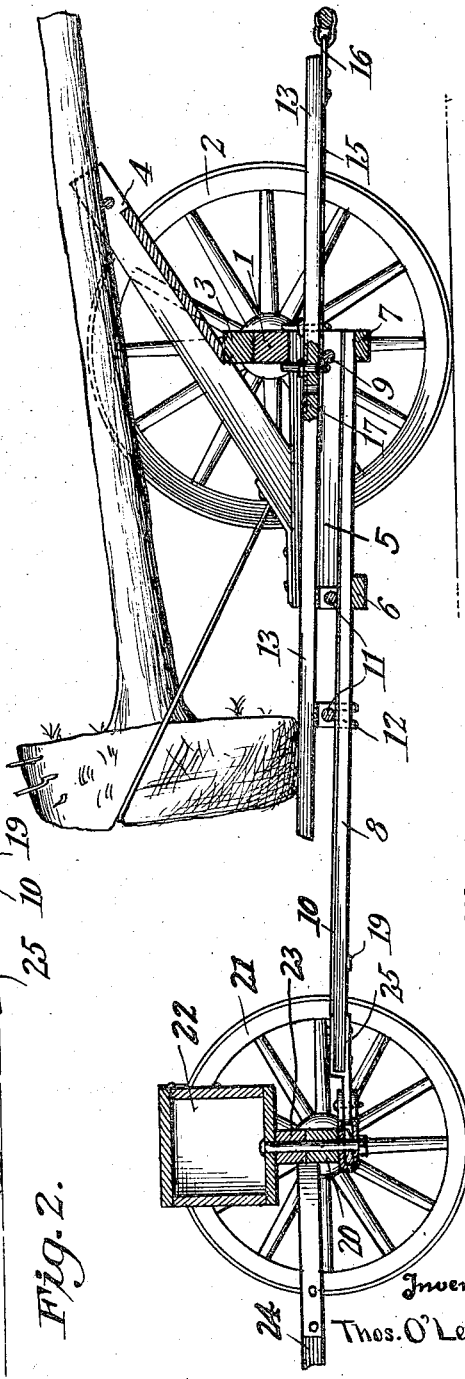

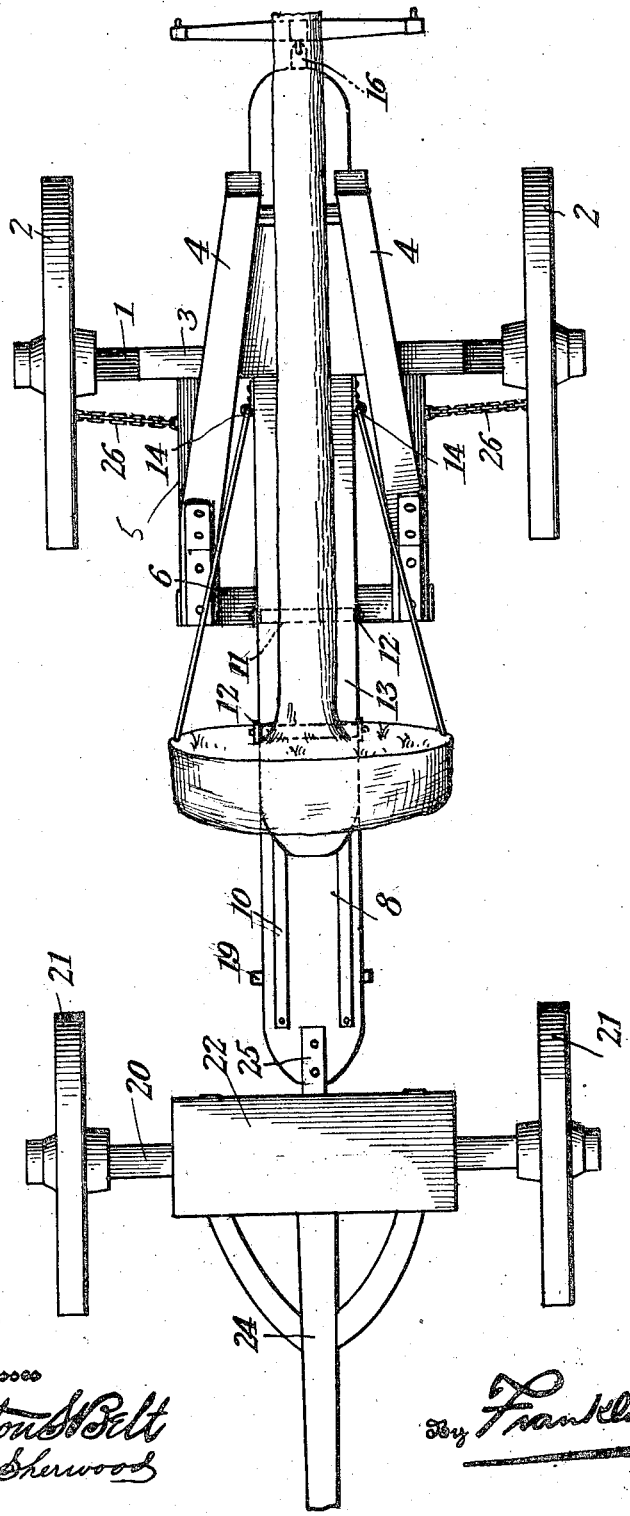

UNITED STATES PATENT OFFICE.

THOMAS O'LEARY, OF BISMARCK, NORTH DAKOTA, ASSIGNOR OF ONE-HALF TO GEORGE M. REGISTER, OF BISMARCK, NORTH DAKOTA.

TRUCK FOR MOVING TREES, &c.

1,161,878.   Specification of Letters Patent.   Patented Nov. 30, 1915.

Application filed December 21, 1914. Serial No. 878,332.

*To all whom it may concern:*

Be it known that I, THOMAS O'LEARY, a citizen of the United States, residing at Bismarck, in the county of Burleigh and State of North Dakota, have invented certain new and useful Improvements in Trucks for Moving Trees, &c.; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in apparatus for hauling trees and other objects and consists in the provision of a simple and efficient apparatus of this nature having various details of construction, combinations and arrangements of parts which will be hereinafter fully described, shown in the accompanying drawings and then specifically defined in the appended claims.

My invention is illustrated in the accompanying drawings, in which:

Figure 1 is a side elevation of the apparatus showing the position the same is adjusted in for receiving the tree or other object. Fig. 2 is a view showing the parts of the apparatus connected together. Fig. 3 is a top plan view, and Fig. 4 is a detail sectional view.

Reference now being had to the details of the drawings by numeral, 1 designates the rear axle of the truck upon which wheels 2 are journaled and secured to said axle is a bolster 3 upon which the inclined beams 4 rest, the lower ends of which are secured to the hound 5 having cross-pieces 6 and 7 at the lower edges thereof and upon which the reach 8 is secured. A roller 9 is mounted in the side pieces of the hound and immediately over the reach 8, a space intervening between said roller and the under surface of the axle 1. Said reach has tracks 10 upon the upper surface thereof and spaced apart and upon which antifriction rollers 11 are adapted to travel, which rollers are held in the forked ends of the yokes 12, secured to the reach section 13, which latter has tracks 15 upon its under surface adapted to travel over the roller 9, and 16 designates a bar which is secured to the rear end of the reach section 13 and is apertured for the reception of an attachment to a whiffletree, so that a team may cause a longitudinal movement to be imparted to the section 13 in one direction. Bars 14, having eyes in the ends thereof, are secured to the opposite sides of the section 13 and to these bars chains or ropes may be fastened to securely hold the tree upon the movable reach section 13, as shown in the drawings. A plate 17, is fastened to the section 13 and is provided with apertures for the purpose of a receiving bolt which may be positioned upon the forward side of the axle and serves as means for holding the section 13 for moving in one direction. A cross-piece 19 is secured to the under surface of the reach section 8 and its ends project beyond the opposite edges thereof and are positioned in the path of the downwardly extending ends of the bars 12 and serve to limit the longitudinal movement of the section 13 in one direction.

The forward axle of the truck is designated by numeral 20 and has wheels 21 journaled thereon, and a box 22 is mounted upon the bolster 23 and forms convenient means for holding tools, while a hound 24 projects from the forward portion of the axle. The forward end of the reach 8 has an apertured connecting bar 25 secured thereto, which is apertured for the reception of the king bolt to fasten the reach to the forward axle.

In order to block the wheels, chains 26 are fastened to the side beams of the hound 5 and may be passed about a spoke, one upon each rear wheel, thus holding the rear part of the truck securely while the tree is being loaded upon the movable reach section.

The operation of my invention will be readily understood and is as follows: The rear axle with the reach is disconnected from the forward axle and the free end of the reach positioned partially underneath the root, as shown in Fig. 1 of the drawings, after which the tree may be tilted over to the position shown in dotted lines with its roots resting upon sliding reach section 13. The team is then connected through the means of the whiffletree with the apertured bar at the rear end of the reach section 13 and the section 13 drawn forward rolling on the tracks upon the upper surface of the reach section 8 until the tree assumes the position shown in Fig. 2, after which the forward end of the reach section 8 may be raised and connected to the king bolt upon the forward axle. In order to hold the section 13 from moving longitudinally when the tree is upon the same, bolts passed through the apertures in the plate 17 and engaging one upon each side of the roller 9 will tend to hold said reach section in place. When it is desired to unload the tree, the forward end of the reach 8 may be disconnected and the bolts removed from the section 13, allowing the latter to roll down to the position the same assumes when the tree is loaded thereon.

By the provision of an apparatus embodying the features of my invention, it will be noted that a simple and efficient device is afforded whereby trees or other objects which are cumbersome may be conveniently loaded upon the truck and conveyed from one place to another and easily unloaded again.

What I claim to be new is:

1. An apparatus for hauling trees, consisting of a truck having a rear and a forward axle, a reach section fixed to the rear axle and adapted to be connected to the forward axle, inclined beams secured to the rear axle, a movable reach section and rollers carried thereby, and tracks upon the fixed section on which said rollers are mounted.

2. An apparatus for hauling trees, consisting of a truck having a rear and a forward axle, a reach section fixed to the rear axle and adapted to be connected to the forward axle, inclined beams secured to the rear axle, a movable reach section, rollers resting upon the fixed reach and upon which one end of the movable section rests, a roller supported by the rear axle and upon which the movable reach section is mounted, and means for locking the movable section in a fixed position.

3. An apparatus for hauling trees, consisting of a truck having a rear and a forward axle, a reach section fixed to the rear axle and adapted to be connected to the forward axle, inclined beams secured to the rear axle, a movable reach section having yokes fastened thereto with slotted ends, rollers in the latter and resting upon the fixed reach, a roller supported by the rear axle and upon which the movable reach rests, projections upon the fixed reach and in the paths of one of said yokes and adapted to limit the movement of the movable reach in one direction.

4. An apparatus for hauling trees, consisting of a truck having a rear and a forward axle, a reach section fixed to the rear axle and adapted to be connected to the forward axle, inclined beams secured to the rear axle, a movable reach section having yokes fastened thereto with slotted ends, rollers in the latter and resting upon the fixed reach, a roller supported by the rear axle and upon which the movable reach rests, projections upon the fixed reach and in the paths of one of said yokes and adapted to limit the movement of the movable reach in one direction, and an apertured bar fastened to the rear end of the movable reach to which a whiffletree is adapted to be attached.

5. A truck for moving trees, consisting of a rear and a forward axle, a hound secured to the rear axle, a reach upon cross-pieces of the hound, a roller mounted between the side beams of the hound, the upper surface of said reach having tracks, a movable reach section having yokes secured thereto with slots in the ends thereof, rollers having pintles mounted in said slots and resting upon said tracks, tracks upon the under surface of the movable reach section and resting upon the roller carried by the hounds, bars secured to the sides of the movable section and having eyes to which ropes are adapted to be attached.

In testimony whereof I hereunto affix my signature in presence of two witnesses.

THOMAS O'LEARY.

Witnesses:
FRANK S. WHEELER,
JOHN F. FORT.